United States Patent
Southerland et al.

(10) Patent No.: US 10,104,314 B2
(45) Date of Patent: Oct. 16, 2018

(54) METHODS AND SYSTEM FOR PRODUCING A TEMPERATURE MAP OF A SCENE

(71) Applicant: DRS Network & Imaging Systems, LLC, Melbourne, FL (US)

(72) Inventors: Richard L. Southerland, Plano, TX (US); Douglas A. Blettner, Dallas, TX (US); David C. Hutchison, Plano, TX (US); Henry W. Neal, Allen, TX (US)

(73) Assignee: DRS Network & Imaging Systems, LLC, Melbourne, FL (US)

(*) Notice: Subject to any disclaimer, the term of this patent is extended or adjusted under 35 U.S.C. 154(b) by 0 days.

(21) Appl. No.: 15/382,199

(22) Filed: Dec. 16, 2016

(65) Prior Publication Data

US 2017/0302864 A1 Oct. 19, 2017

Related U.S. Application Data

(63) Continuation of application No. 14/206,297, filed on Mar. 12, 2014, now Pat. No. 9,531,964.

(Continued)

(51) Int. Cl.
*G06K 9/00* (2006.01)
*H04N 5/33* (2006.01)
(Continued)

(52) U.S. Cl.
CPC ............... *H04N 5/33* (2013.01); *G01J 5/025* (2013.01); *G01J 5/0806* (2013.01); *G01J 5/10* (2013.01);
(Continued)

(58) Field of Classification Search
CPC .. G01J 5/025; G01J 5/0806; G01J 5/10; G01J 2005/0077; G01J 2005/0081; G06T 3/40;
(Continued)

(56) References Cited

U.S. PATENT DOCUMENTS

| 5,323,334 A | 6/1994 | Meyers et al. |
| 5,335,091 A | 8/1994 | Palum |

(Continued)

FOREIGN PATENT DOCUMENTS

| EP | 483530 | 5/1992 |
| EP | 600742 | 6/1994 |

(Continued)

OTHER PUBLICATIONS

U.S. Appl. No. 14/206,297, "Non-Final Office Action", dated May 9, 2016, 7 pages.
(Continued)

*Primary Examiner* — Aaron W Carter
(74) *Attorney, Agent, or Firm* — Kilpatrick Townsend & Stockton LLP

(57) ABSTRACT

A method for generating a temperature map of a scene may include receiving thermal data of the scene, wherein the thermal data includes a plurality of frames of thermal infrared data. A mapping may be created for each frame of the plurality of frames based on the digital thermal infrared data. The method further comprises generating the temperature map using the mapping, wherein the temperature map is generated prior to a contrast enhancement process and separately transmitting the temperature map and the digital thermal infrared data in a data channel.

10 Claims, 4 Drawing Sheets

Related U.S. Application Data

(60) Provisional application No. 61/786,077, filed on Mar. 14, 2013, provisional application No. 61/785,856, filed on Mar. 14, 2013.

(51) Int. Cl.

| | | |
|---|---|---|
| *G01J 5/02* | (2006.01) | |
| *G06T 5/00* | (2006.01) | |
| *G06T 3/40* | (2006.01) | |
| *H04N 19/46* | (2014.01) | |
| *G01J 5/08* | (2006.01) | |
| *H04N 21/2343* | (2011.01) | |
| *H04N 21/236* | (2011.01) | |
| *H04N 21/434* | (2011.01) | |
| *G01J 5/10* | (2006.01) | |
| *G01J 5/00* | (2006.01) | |

(52) U.S. Cl.
CPC .............. *G06T 3/40* (2013.01); *G06T 5/001* (2013.01); *G06T 5/007* (2013.01); *H04N 19/46* (2014.11); *H04N 21/23439* (2013.01); *H04N 21/23605* (2013.01); *H04N 21/23614* (2013.01); *H04N 21/4348* (2013.01); *G01J 2005/0077* (2013.01); *G01J 2005/0081* (2013.01)

(58) Field of Classification Search
CPC ......... G06T 3/001; G06T 3/007; H04N 19/46; H04N 21/23439; H04N 21/23605; H04N 21/23614; H04N 21/4348
USPC ...... 382/274, 254; 250/208.1, 221; 106/271, 106/274; 340/5.61, 5.64, 12.25; 348/164; 701/50
See application file for complete search history.

(56) References Cited

U.S. PATENT DOCUMENTS

| | | |
|---|---|---|
| 5,350,911 A | 9/1994 | Rafanelli et al. |
| 5,514,865 A | 5/1996 | O'Neil |
| 5,717,208 A | 2/1998 | Woolaway, II |
| 5,798,875 A | 8/1998 | Fortin et al. |
| 5,811,808 A | 9/1998 | Cannata et al. |
| 5,838,813 A | 11/1998 | Kancler et al. |
| 5,994,699 A | 11/1999 | Akagawa et al. |
| 6,011,584 A | 1/2000 | Allred et al. |
| 6,573,819 B1 | 6/2003 | Oshima et al. |
| 7,370,975 B2 | 5/2008 | Taniguchi et al. |
| 7,421,152 B2 | 9/2008 | Kang |
| 7,614,177 B1 * | 11/2009 | Wheeler ............. A01K 87/007 43/17.5 |
| 7,622,715 B2 | 11/2009 | Ignatowicz et al. |
| 7,633,502 B2 * | 12/2009 | Willis ................. A61B 5/0422 345/420 |
| 7,924,312 B2 | 4/2011 | Packard et al. |
| 7,995,859 B2 | 8/2011 | Högasten et al. |
| 7,996,066 B2 | 8/2011 | Schlagheck et al. |
| 8,099,218 B2 * | 1/2012 | Glee .................... E01C 19/004 106/271 |
| 8,189,050 B1 | 5/2012 | Hughes et al. |
| 8,247,770 B2 | 8/2012 | Fischer |
| 8,373,757 B1 | 2/2013 | Nguyen et al. |
| 8,476,590 B2 | 7/2013 | Stratmann et al. |
| 8,478,480 B2 | 7/2013 | Mian et al. |
| 8,494,220 B2 | 7/2013 | Del et al. |
| 8,649,932 B2 | 2/2014 | Mian et al. |
| 8,787,619 B2 | 7/2014 | Del et al. |
| 8,868,291 B2 | 10/2014 | Mian et al. |
| 9,071,720 B2 | 6/2015 | Ikari et al. |
| 9,251,595 B2 | 2/2016 | Bailey et al. |
| 9,531,964 B2 * | 12/2016 | Southerland ............ G01J 5/025 |
| 9,628,724 B2 * | 4/2017 | Hutchison ................ H04N 5/33 |
| 9,684,978 B2 * | 6/2017 | Abreo .................... G06T 11/001 |
| 9,736,399 B2 * | 8/2017 | Neal ......................... H04N 5/33 |
| 9,757,032 B2 * | 9/2017 | Gross .................... A61B 5/0008 |
| 9,807,318 B2 * | 10/2017 | Ingerhed ................. H04N 5/33 |
| 2004/0208395 A1 | 10/2004 | Nomura et al. |
| 2004/0232333 A1 | 11/2004 | Guldevall |
| 2010/0030506 A1 | 2/2010 | Cairnduff |
| 2011/0063427 A1 | 3/2011 | Fengler et al. |
| 2011/0159959 A1 | 6/2011 | Mallinson et al. |
| 2011/0169961 A1 | 7/2011 | Wu et al. |
| 2011/0249014 A1 | 10/2011 | Kolstad et al. |
| 2012/0091340 A1 | 4/2012 | Young |
| 2012/0162508 A1 | 6/2012 | Okuda et al. |
| 2012/0224019 A1 | 9/2012 | Samadani et al. |
| 2013/0048855 A1 * | 2/2013 | Abreo ...................... H04N 5/33 250/330 |
| 2013/0050453 A1 | 2/2013 | Bergstrom et al. |
| 2013/0072120 A1 | 3/2013 | Wu |
| 2013/0083199 A1 | 4/2013 | Choi et al. |
| 2013/0088604 A1 | 4/2013 | Hamrelius et al. |
| 2013/0222604 A1 * | 8/2013 | Ingerhed .................. H04N 5/33 348/164 |
| 2013/0345545 A1 | 12/2013 | Gross et al. |
| 2014/0253735 A1 | 9/2014 | Fox et al. |
| 2014/0270563 A1 | 9/2014 | Bailey et al. |
| 2015/0124102 A1 * | 5/2015 | Frost ....................... H04N 5/33 348/165 |
| 2015/0130949 A1 * | 5/2015 | Christison .......... H04N 5/23229 348/164 |
| 2015/0271420 A1 * | 9/2015 | Neal ........................ H04N 5/33 348/164 |
| 2015/0281598 A1 | 10/2015 | Southerland et al. |
| 2015/0281749 A1 * | 10/2015 | Hutchison ............... G01J 5/025 348/164 |
| 2016/0074724 A1 | 3/2016 | Terre |
| 2016/0086315 A1 | 3/2016 | Bailey et al. |
| 2017/0195583 A1 * | 7/2017 | Hutchison ................ H04N 5/33 |

FOREIGN PATENT DOCUMENTS

| | | |
|---|---|---|
| FR | 2661583 | 10/1991 |
| GB | 2248742 | 8/1992 |
| WO | 2012170954 | 12/2012 |
| WO | 2014144492 | 9/2014 |
| WO | 2014152681 | 11/2014 |

OTHER PUBLICATIONS

U.S. Appl. No. 14/206,297 , "Notice of Allowance", dated Aug. 17, 2016, 7 pages.
U.S. Appl. No. 14/206,341 , "Non-Final Office Action", dated Jun. 2, 2016, 7 pages.
U.S. Appl. No. 14/206,341 , "Notice of Allowance", dated Dec. 12, 2016, 8 pages.
U.S. Appl. No. 14/211,796 , "Notice of Allowance", dated Sep. 10, 2015, 11 pages.
U.S. Appl. No. 14/211,796 , "Restriction Requirement", dated May 6, 2015, 9 pages.
U.S. Appl. No. 14/964,165 , "Notice of Allowance", dated Jul. 29, 2016, 10 pages.
PCT/US2014/027610 , "International Search Report & Written Opinion", dated Sep. 30, 2014, 12 pages.
PCT/US2014/028922 , "International Search Report and Written Opinion", dated Aug. 27, 2014, 8 pages.

\* cited by examiner

METHODS AND SYSTEM FOR PRODUCING A TEMPERATURE MAP OF A SCENE

CROSS-REFERENCES TO RELATED APPLICATIONS

This application is a continuation of U.S. patent application Ser. No. 14/206,297, entitled "METHODS AND SYSTEMS FOR PRODUCING A TEMPERATURE MAP OF A SCENE," filed Mar. 12, 2014, which claims priority to U.S. Provisional Patent Application No. 61/786,077, filed Mar. 14, 2013, entitled "METHOD AND SYSTEMS FOR PRODUCING A TEMPERATURE MAP OF A SCENE," and U.S. Provisional Patent Application No. 61/785,856, filed Mar. 14, 2013 entitled "METHOD AND SYSTEM FOR PROVIDING SCENE DATA IN A VIDEO STREAM," the disclosures of which are hereby incorporated by reference in their entirety for all purposes. This application is related to U.S. Pat. No. 9,251,595 corresponding to U.S. patent application Ser. No. 14/211,796, filed on Mar. 14, 2014, entitled "METHOD OF SHUTTERLESS NON-UNIFORMITY CORRECTION FOR INFRARED IMAGERS," and U.S. application Ser. No. 14/206,341 filed Mar. 12, 2014, entitled "METHOD AND SYSTEM FOR PROVIDING SCENE DATA IN A VIDEO STREAM," the disclosure of which is hereby incorporated by reference in its entirety for all purposes.

BACKGROUND OF THE INVENTION

The electromagnetic spectrum encompasses radiation from gamma rays, x-rays, ultra violet, a thin region of visible light, infrared, terahertz waves, microwaves, and radio waves, which are all related and differentiated in the length of their wave (wavelength). All objects, as a function of their temperatures, emit a certain amount of radiation. For terrestrial objects, a significant portion of this radiation is emitted in the infrared.

Thermal cameras can detect this radiation in a way similar to the way a photographic camera detects visible light and captures it in a photograph. Because thermal cameras detect and capture infrared light, thermal cameras can work in complete darkness, as ambient light levels are not needed. Images from infrared cameras typically have a single color channel because thermal cameras generally use sensors that do not distinguish different wavelengths of infrared radiation. Color thermal cameras require a more complex construction to differentiate wavelength and color has less meaning outside of the normal visible spectrum because the differing wavelengths do not map uniformly into the system of color visible to and used by humans.

The monochromatic images from infrared cameras are often displayed in pseudo-color, where changes in color are used, as opposed to changes in intensity, to display changes in the signal, for example, gradients of temperature. This is useful because although humans have much greater dynamic range in intensity detection than color overall, the ability to see fine intensity differences in bright areas is fairly limited. Therefore, for use in temperature measurement, the brightest (warmest) parts of the image are customarily colored white, intermediate temperatures reds and yellows, transitioning to blues and greens, with the dimmest (coolest) parts black. A scale should be shown next to a false color image to relate colors to temperatures.

Thermal cameras have many applications, particularly when light and visibility are low. For example, thermal cameras have been used in military applications to locate human beings or other warm entities. Warm-blooded animals can also be monitored using thermographic imaging, especially nocturnal animals. Firefighters use thermal imaging to see through smoke, find people, and localize hotspots of fires. With thermal imaging, power line maintenance technicians locate overheating joints and parts, a telltale sign of their failure, to eliminate potential hazards. Where thermal insulation becomes faulty, building construction technicians can see heat leaks to improve the efficiencies of cooling or heating air-conditioning. Thermal imaging cameras are also installed in some luxury cars to aid the driver at night. Cooled infrared cameras can be found at major astronomy research telescopes, even those that are not infrared telescopes.

SUMMARY OF THE INVENTION

Embodiments of the present invention generally relate to optical systems and methods of processing video signals, for example thermal video signals. Methods and systems for producing a supportive data map of a scene image are provided. More particularly, the present invention relates to systems and methods of processing supportive data such as temperature data for thermal video signals. Merely by way of example, radiometric infrared cameras and systems may be used to gather thermal data of a scene, and generate thermal video and a temperature map of the scene.

According to an embodiment of the invention, a radiometric thermal camera is provided. For example, a radiometric thermal camera can be a radiometric infrared camera. The radiometric thermal camera can be configured to detect and capture other supportive data (e.g., accoustic, analytic, depth, thermal, X-ray, etc.) of a scene along with baseline image data of the scene. In other embodiments, various devices may be used to detect and capture visible and non-visible light (e.g., thermal data). In one embodiment, thermal data may be captured and processed into a format (e.g., converted from analog to digital) such that a two-dimensional matrix representing a temperature map of the scene, in addition to thermal video (i.e., contrast) data, can be generated from the thermal data. The temperature map may be generated using a look-up table (LUT). The thermal video data may be processed separately from the temperature map. Additionally, the thermal video data and temperature map may be transmitted separately to a camera interface for display to a user. One advantage of processing the video data and temperature data separately is that it enables a greater amount of flexibility in the method of contrast enhancement used for display of video data than other methods of transmitting temperature information.

Video data may include visible light captured by the camera, and wavelengths of visible light captured typically may be in the range of 400-700 nm. Thermal data may include non-visible light, e.g. infrared light, captured by the camera, and wavelengths of infrared light captured may be as long as 14 μm. The video data in one embodiment of the invention can come from a thermal sensor. The thermal sensor can detect emitted radiation in a long wave infrared (LWIR) spectrum, and may not detect reflected radiation in the visible spectrum. The thermal sensor may operate in the LWIR spectrum (nominally 8-14 μm), and may output thermal video. From the post-NUC (pre-AGC) thermal video, a LUT may be used to create a temperature map. The camera then outputs a data stream that includes both the thermal video and the temperature map.

The range of thermal data can be much larger than the range of video data. However, a relevant range of thermal data may be much narrower than a relevant range of video data. For example, video data of a scene including a person may involve many varying factors, such as color, shadows, light, and movement. Thus, a majority of visible light range is relevant as it is visible and detectable to the naked eye. However, temperature of a scene typically does not vary as drastically or quickly as visible light factors. Even when the person in the scene is moving, the body temperature of the person remains within a small range varying slightly around normal body temperature of 98.6° F. Since the variations in the temperature are so small, depending on an ambient temperature of the scene, a relevant range of temperature may be much narrower than the relevant range of visible light captured in video.

In one embodiment of the invention, the video contrast information described herein may be captured by a thermal camera. A change in the thermal radiation from an object in the scene may correspond simultaneously to a change in both video contrast and temperature information. The temperature information may be tracked at the same or different precision and timescale that is important for viewing video contrast information, and that updated temperature information may be provided and refreshed to the system less frequently than video contrast information.

Accordingly, processing and transmitting video data and thermal data, for example, temperature data, at the same frequency and same range may be bandwith-intensive, utilizing heavy processing resources, memory, and increasing processing time. However, other processing techniques of thermal data may compromise accuracy and completeness of thermal data (e.g., tempertaure data). Embodiments of the invention address this and other problems, and provide many benefits and advantages.

Methods of and systems for generating a temperature map of a scene are provided. The method includes receiving video data of the scene, wherein the video data is in analog format and includes a plurality of frames. The video data is converted analog to digital format to create digital video data. Using the digital video data, a lookup table is created for each frame of the plurality of frames. A temperature map representing temperature data of the scene is generated using the lookup table. The temperature map is then transmitted separately from the digital video data in the same data channel.

According to embodiments of the invention, different processing and transmission techniques may be used to separately process and transmit thermal data and video data of a scene. Thermal data may include temperature data. For example, since temperature data may vary in a smaller relevant range and less quickly as, and may be tracked at the same or different precision and timescale than video data, temperature data may be captured and processed at a rate slower than video data, without significantly compromising accuracy and completeness of thermal data of the scene, for example the temperature data of the scene.

In one embodiment of the invention, a method of generating a temperature map of a scene is provided. The method includes receiving thermal data of the scene. The thermal data can include a plurality of frames of thermal infrared data. Further, the temperature map may be generated based on at least the thermal data, and the temperature map can be generated prior to a contrast enhancement process of the thermal data. The method can further comprise transmitting the temperature map and the thermal data concurrently (e.g., simultaneously) in a data channel as a data stream. The temperature map can be generated using a lookup table. As an example, the lookup table can be created by converting video levels to temperature. In an embodiment, the lookup table is a predetermined lookup table.

In another embodiment of the invention, an apparatus for generating a temperature map of a scene is provided. The apparatus can include a detector configured to receive thermal data of the scene, the thermal data including a plurality of frames of thermal infrared data. A calibrated mapper in the apparatus may be configured to create a mapping for each frame of the plurality of frames based on the digital thermal infrared data. Additionally, the apparatus may comprise a temperature map generator may be configured to generate the temperature map using the mapping; and a data channel interface configured to transmit the temperature map separately from the digital infrared light data.

Furthermore, in other embodiments, the temperature data may be provided at a different spatial resolution as the video data, and temperature data can be captured and processed at a lower resolution. Thus, benefits and advantages achieved by embodiments of the present invention include reduced bandwidth without comprising accuracy and completeness of thermal data, for example temperature data. These and other embodiments of the invention, along with many of its advantages and features, are described in more detail in conjunction with the text below and attached figures.

DETAILED DESCRIPTION OF SPECIFIC EMBODIMENTS

Embodiments of the invention are related to methods and systems, such as radiometric thermal cameras (e.g., radiometric infrared cameras), enabled to capture, process, and transmit video and supportive data, such as thermal and temperature data. In an embodiment of the invention, thermal data may be processed into a two-dimensional matrix representing a temperature map of a scene. The temperature map may be generated using a look-up table, and transmitted separately from the video data. The temperature map may be transmitted at a different frame rate than a frame rate at which the video data is transmitted. Furthermore, the temperature map may be transmitted at a different spatial resolution than the resolution at which the video data is transmitted.

Figure 1:
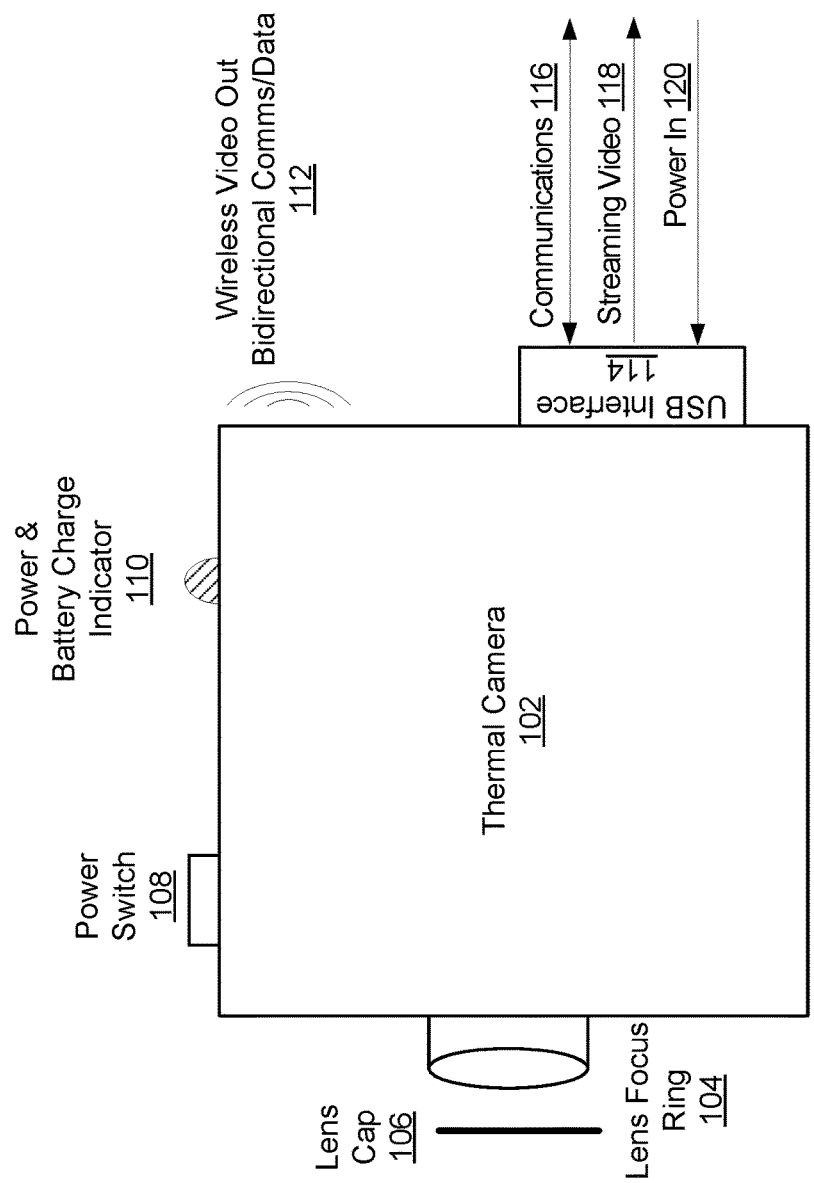
FIG. 1 is a simplified schematic diagram illustrating a radiometric thermal camera (e.g., radiometric infrared camera) according to an embodiment of the present invention.

FIG. 1 is a simplified schematic diagram illustrating a radiometric thermal camera (e.g., radiometric infrared camera) according to an embodiment of the present invention. The radiometric thermal camera (e.g., radiometric infrared camera) can be a thermal camera having a body 102. Additional mechanical interfaces may include the body 102 being enabled to be mounted via a universal consumer device interface or a ¼"-20 Tripod interface. The camera can include several components for user interfaces in which a user can operate the camera. For example, in some embodiments, the camera can have a lens focus ring 104, which may include a lens with a shutter (internally, not shown), and/or a lens cap 106. To turn the camera on and off, there may be a power switch 108. Additionally, there may be an indicator 110 representing the power state and to indicate when the battery is charging. For example, it may be a light (e.g., LED) that is green when the battery is above a certain threshold and red when the battery is below the threshold, warning the user of limited use so that the battery can be charged. In another example, the indicator 110 may be a light that is green when the power is on and red when the battery is charging.

The thermal camera may also have several electrical interfaces, and may be configured to have a wireless interface 112, enabling the camera to receive and transmit communication and data wirelessly. For example, the wireless interface 112 may be enabled for bidirectional communication and/or video output using Wi-Fi protocols (e.g., 802.11, etc.). Alternatively, the thermal camera may also be configured for wired communication through a USB (Universal Serial Bus) interface 114, a USB Mini interface, or the like. The USB interface 114 may be configured to transmit communication 116, bidirectional streaming video out 118, and/or power in 120.

The wireless interface 112 is a bi-directional communications interface that may be enabled to transmit the temperature map captured and generated by the camera. The temperature map may also be transmitted across the streaming video 118. Thus, the camera 102 may employ two method of transmitting video and data (e.g., temperature map) from the camera. In an embodiment, the wireless interface 112 may be the primary method to transmit the temperature map. The USB interface 114 may be used to provide power to charge the camera through the power connection 120, for example, to charge a battery in the camera for mobile use. The USB interface 114, in another embodiment, may also include a communications channel 116 for control signals, for example, for use as a factory interface to upload calibration settings or perform testing. Alternatively, the communications channel 116 may be used by an end user to upload control settings, such as custom programming, calibration coefficients, etc.

In an embodiment, the wireless interface 112 may be used to transmit video and/or data (e.g., a temperature map) to another mobile device, such as a smartphone. For example, an end user having a mobile device (e.g., smartphone, tablet) can connect to the thermal camera via a wireless connection (e.g., wi-fi) to receive thermal video and the temperature map on his mobile device. The mobile device may host and operate applications to view and/or process the thermal video and data. For example, the mobile application may comprise code enabling various functions with the video data, such as displaying the thermal video data, viewing the temperature map, using the temperature map to measure temperatures for radiometric purposes, such as overlay symbology, color pallets, etc. The end user may also physically connect his mobile device to the thermal camera 102 via the USB interface 114, such that via the streaming video connection 118, the thermal camera 102 can transmit video and temperature data to the end user's mobile device.

Figure 2:
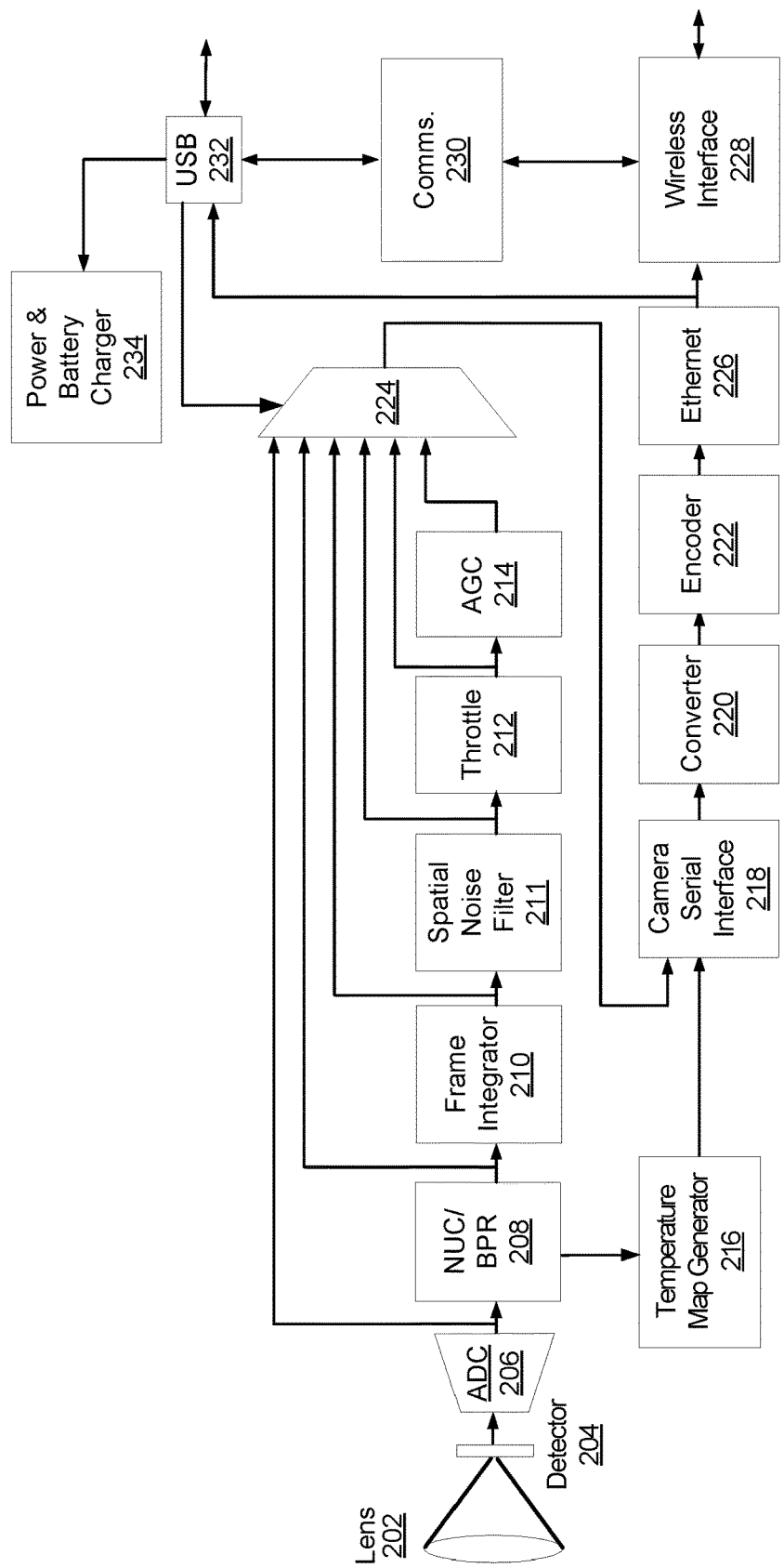
FIG. 2 shows an example block diagram illustrating an example system according to an embodiment of the invention.

FIG. 2 illustrates an example functional block diagram of a radiometric thermal camera (e.g., radiometric infrared camera) according to an embodiment of the invention. The radiometric camera may include a lens 202 for a detector 204. The camera may also include a focus ring and/or shutter. The lens 202 and detector 204 can be capable of capturing infrared radiation over a horizontal field of view (HFOV) of 40° and/or can be enabled for manual focus by a user using the focus ring. In an embodiment of the invention, the detector may utilize a lens or other suitable device for capturing and receiving infrared light. In other embodiments of the invention, a suitable detector may be capable of capturing and receiving visible light and infrared (e.g., non-visible) light. In other embodiments, the detector and lens are capable of capturing light of other spectrums, such as visible or reflective infrared. The detector 204 can be configured to capture data containing thermal data at a predetermined pixel resolution (e.g., 320×240 pixel resolution) at a predetermined frame rate (e.g., 60 Hz). In other embodiments, other suitable devices may be used to capture data containing both visible light and infrared (e.g., thermal) data. In other embodiments of the invention, other suitable devices may be used to capture data containing both light and supportive data (e.g., temperature, acoustic, X-ray, etc.) The received data may then be processed by an analog-to-digital converter (ADC) 206.

The digital signal can be sent to a non-uniformity correction (NUC) and bad pixel replacement (BPR) module 208. The output from the NUC and BPR module 208 can be sent to a temperature map generator module 216. The digital signal from the ADC 206 is processed to perform non-uniformity correction and bad pixel replacement in NUC/BPR module 208. Non-uniformity correction attempts to compensate for response variability. For example, a scene with a constant temperature will appear as a flat field, therefore ideally the output of the detector would be constant. The output of the detector would appear as a same video level or gray level for all the pixels in the thermal image. The NUC/BPR module 208, using BPR algorithms, normalizes the constant video level by scanning for bad pixels, which are detected as statistical outliers from the rest of the pixels, and substitute the bad pixels with information from their adjacent pixels.

Thermal video data from the NUC/BPR module 208 can be processed by a frame integrator 210. The frame integrator 210 basically allows the thermal camera to combine information from different frames that occur in different points in time. Therefore, the plurality of frames received are temporally integrated to help reduce temporal noise components. In an embodiment, a special noise filtering module 211 to filter spatial noise from the output of the frame integrator 210. Spatial noise filtering processing can be similar to temporal noise filtering such that it detects and filters out spatial noise instead of temporal noise that is filtered out by the frame integrator 210.

Thermal video data from the NUC/BPR module 208 can be processed by the frame integrator 210, and then have its frame rate adjusted/throttled appropriately by the throttle 212 (e.g., to output 30 Hz or 9 Hz video). The throttle 212 may be used to regulate the frame rate to a predetermined frequency. The detector 204 may receive data at a certain frame rate, for example, at 60 Hz, and the throttle 212 may adjust that frame rate to a lower frequency, for example, to 9 Hz or 30 Hz. Lowering the frame rate may be to satisfy certain export requirements and also to help manage bandwidth.

In other embodiments of the invention, temperature data may be separated from other video captured by the lens. In other embodiments, thermal video data may be separate from other video captured by the lens. Other frame rates can be utilized as well. The frame integrator 210 combines the signal from sequential frames to reduce noise. There can be some frame rate adjustment in the visible video data by the throttle 212. For example, video data captured by the detector at 60 Hz can be adjusted to 30 Hz or 9 Hz, depending on intended future applications of the video data.

The output of the throttle 212 may then be processed by an Automatic Gain Control (AGC) module 214.

Typical scenes encompass a fraction of a full dynamic range, so in mapping the entire AGC output to the display, the scenes would appear gray and washed out. To compensate, the AGC tries to take the fraction of that dynamic range, and map the fraction to the output. This mapping of a smaller portion allows visibility of hotter objects in the scene with the contrast enhanced. For example, though the objects might not be at the AGC limit, higher temperatures are mapped to white pixels. Colors in the scene are faded, and even though they might not be at the lowest end of the AGC, may be mapped to the black pixels. As a result, the AGC 214 may serve to provide contrast enhancement of the temperature of the scene for display to an end user.

The output of the AGC 214 may then be sent to a multiplexer 224, used to select only one video output at a time. For example, in one mode of system operation, the multiplexer 224 selects the output of the AGC block 214. The other inputs (e.g., output from A-to-D converter, frame integrator, and/or throttle) may be only selected for engineering uses.

According to one embodiment of the invention, the analog-to-digital converter may be a 14-bit A-to-D converter. Therefore, there may be values ranging from zero to 16,383 ($2^{14}$) digital values based on what the detector is capturing. Detectors may be set up so that they can capture a very broad range of scene temperatures.

For example, in a scene, it may include objects as cold as −20° C. to objects as hot as 120° C. Additionally, the camera may have an operating mode over a wide range of camera temperatures (i.e., ambient temperature of operation). For example, the radiometric infrared system according to an embodiment of the invention may operate down to 0° C. (i.e., the camera's ambient environment is actually 0° C.) and up to 50° C. Therefore based on the range of scene temperatures and the different ambient temperatures of operation, detectors may be configured to accommodate such that the scene temperatures may be captured over the full ambient temperature range. Accordingly, for most scenes, at any time, typically there may not be objects as cold as −20° C. and as hot as 120 C. Typical scenes may be at room temperature, in the range of 20-30° C. Therefore, although the detector captures a full 14-bit A-to-D range which was configured to accommodate the full scene temperature range and the full ambient temperature range, there may not be significant contrast in temperature across the entire range. Only a small range of the 0 to 16,383 values may contain significant variation in temperature data.

The AGC module 214 takes the smaller range of significant data, and it optimizes the contrast in that range to typically an 8-bit, therefore 256 values, output that would then be displayed to users. Therefore, instead of the users seeing a bland gray scene without a lot of contrast visible to the eye a smaller range that contains the significant data is amplified. The smaller range is amplified to fill a 256-count range so that users can see the contrast in the scene.

In one embodiment of the invention, the AGC module 214 may serve to maintain and/or increase radiometric accuracy and temperature measurement. Therefore the detectors may be calibrated to be radiometrically accurate, so that they are calibrated to not only detect hotter objects to be a specific color or a specific shade of gray, and colder objects to be another color or another shade of gray. To achieve this radiometric accuracy, the non-uniformity correction module 208 may be used in the calibration of the detector.

The AGC module 214 may use a linear or non-linear process to optimize the video contrast. The AGC module 214 may be an adaptive system where an average output signal level is fed back to adjust the gain to an appropriate level for a range of input signal levels. Additionally, the AGC module 214 may also preserve the temperature and radiometric accuracy of the video going through that block. However, in some AGC methodologies, it may be difficult to keep track of the temperature data going through the AGC block. Other existing methods for keeping track of temperature information involve the use of a look-up table (LUT) for every frame of video, which may represent a mapping from the input 14-bit values (i.e., 0 to 16,383 input values) to an 8-bit or 256 value range output.

In mapping the 16,383 values in the input to 256 values in the output, some variations in the input may be combined such that not all variations are mapped to the output. However, since a LUT exists for AGC of every frame, the LUT may be used to determine from an 8-bit output video level the original 14-bit input level. Thus, for these types of contrast enhancement that adhere to such a mapping, the radiometric accuracy can be maintained and a mapping from a post-AGC video level to a particular temperature can be determined. As opposed to a LUT that may be used for AGC, in which the AGC LUT can be updated for each frame of video, the LUT according to one embodiment of the invention used to generate a temperature map from the post-NUC video can be a fixed LUT. The fixed LUT remains unchanged from each frame of video, ambient temperature, and/or camera-to-camera. The fixed LUT may be used to convert the calibrated post-NUC video levels to a temperature to generate a temperature map. In another embodiment of the invention, the LUT used to generate a temperature map from the post-NUC video can be a dynamic LUT.

A variety of contrast enhancement methods can be used in the AGC module 214. Non-reversible processes may be implemented, for example, Local Area Processing (LAP). During LAP of an image, a series of frequency domain processes and decompositions of the image are performed, contrast manipulation is performed, and then the image is reconstructed. For such methods of contrast enhancement, mapping of video levels to temperature may be complex. According to embodiments of the invention, at the output of the NUC/BPR module 208, a complete temperature map is generated by the temperature map generator 216 using a LUT. Unlike a LUT that may be used in AGC in which the LUT changes from frame-to-frame, the LUT used to generate the temperature map can be fixed for all frames. By computing the temperature information at this point, a greater degree of flexibility can be achieved in the methodology selected for contrast enhancement. For example, a camera with a thermal sensor may operate in the LWIR spectrum (nominally 8-14 μm), and may output thermal video. From the post-NUC (pre-AGC) thermal video, a LUT may be used to create a temperature map. The camera then outputs a data stream that includes both the thermal video and the temperature map.

In some embodiments of the invention, the NUC/BPR module 208 may be implemented using a field-programmable gate array (FPGA) integrated circuit. FPGA's may be programmed after manufacturing, and thus are capable of being used in many applications. In FIG. 2, for example, the temperature map generator 216, frame integrator 210, throttle 212, and AGC module 214 may be implemented using an FPGA. Other suitable integrated circuits may also be used to implement the functions of the modules described above, for example, application-specific integrated circuits (ASIC). Two-dimensional matrix temperature map can be generated after processing by the NUC/BPR module 208. Also, temperature map generation can occur in parallel with AGC processing of video in the AGC module 214.

The multiplexor 224 may allow to select video from various points for output downstream, for example, the multiplexor 224 may select a raw input from the AGC 206, post-NUC/BPR data from the NUC/BPR module 208, the output from the frame integrator 210, the output from the spatial noise filter 211, or post-throttled data from the throttle 212. Having the multiplexor 224 to have the ability to select from various outputs allows flexibility in the potential processing functions depending on the data used.

The select signal for multiplexor 224 may be a serial command to the camera that may be provided by an end-user. Various outputs may be selected for processing functions for factory calibration and tests. In another embodiment, the select interface may be enabled to be used as a customizable user interface. For example, the user may wish to process the raw BPR output data from the NUC/BPR module 208 to build a customized contrast enhancement or filtering.

As an example, a radiometric thermal camera (e.g., radiometric infrared camera) according to an embodiment of the invention may have a resolution of 320×240 pixels. Thus, in addition to the 320×240 pixel resolution, the 8-bit video level that is outputted from the AGC module 214, a 320×240 pixel temperature map is generated by the temperature map generator 216. The temperature map includes data representing a temperature of every pixel in the image of the scene. The temperature map, along with an 8-bit video level output from the output of multiplexor 224 may be transmitted to a camera serial interface 218. According to an embodiment of the invention, an output from the camera serial interface 218 may be processed by a converter 220 to convert to YCbCr, for color image pipeline processing. After conversion to YCbCr, an encoder 222 may be used to encode using for example, H.264 hardware encoding. According to an embodiment of the invention, the converter 220 and encoder 222 may be implemented using system-on-a-chip (SoC) integrated circuits. SoC's may process digital, analog, mixed-signal, and often radio-frequency functions on a single chip substrate, and thus may be used for embedded systems and communication interfaces. For example, SoC's may be used to implement wireless interface 228, USB interface 232, system communications interface 230, and/or Ethernet interface 226 in FIG. 2.

The camera serial interface 218 may serve to manage communications with the outside world. The converter 220 and encoder 222 perform video formatting for the output. The encoder 222 may implement various compressing techniques. The Ethernet interface 226 may communicate with the wireless interface 228 of the camera. Therefore the camera serial interface 218, converter 220, encoder 222, and Ethernet interface 226 receive the thermal data processed by the FPGA (containing the ADC 206, NUC/BPR module 208, frame integrator 210, spatial noise filter 211, throttle 212, AGC module 214, and multiplexor 224) and configuring the data to be send out over the wireless interface 228. The wireless interface 228 can be in parallel with the USB interface 232. The USB interface 232, as mentioned above, may also be coupled to the power battery charger interface 234.

According to an embodiment of the present invention, the radiometric thermal camera (e.g., radiometric infrared camera) may generate a 320×240 resolution temperature map representing the temperature of every pixel in a scene as a 16-bit value encoded using an 11.5 encoding scheme in degrees Kelvin. In the 11.5 encoding scheme, the 11-bit is the integer part of the pixel temperature and the 5-bit is the decimal portion of the pixel temperature, thus providing a 16-bit temperature value for each pixel. Other encoding schemes are possible as well. The temperature map may be transmitted in addition to, but separately from, the video output from the post-AGC module 214 (e.g., video contrast information). Since the temperature map is kept separate, it may not be necessary to trace the temperature measurement accuracy and radiometric accuracy through the contrast manipulation from the AGC module 214.

The radiometric thermal camera (e.g., radiometric infrared camera) according to one embodiment of the invention may also produce a video signal or video data that is transmitted with, but separately from, the temperature map. The video data generated can be post-AGC, or processed by other contrast enhancement techniques, and can have a resolution of 320×240 and an 8-bit grayscale, which contains 256 contrast levels. In one embodiment of the invention, the camera, or external devices (e.g., smart phone, computer, etc.) that may be in communication with the radiometric thermal camera (e.g., radiometric infrared camera), may operate a software application enabled to convert the 8-bit grayscale to a selectable color palette and/or other customizable features determined by a user. The video data may be transmitted at a frame rate of 9 Hz. In another embodiment of the invention, the video data may be transmitted at a frame rate of 30 Hz.

Another advantage achieved by embodiments of the present invention is that the temperature lookup table enables the conversion of the post NUC/BPR data to directly represent the temperature accurately. Performing this repeatable conversion before AGC processing allows much greater flexibility in the methods possible for contrast enhancement of the video. It also allows greater control of the bandwidths needed for the video data separately from the temperature data. Further, the lookup table may be small relative to the total amount of information processed and transmitted, as the LUT can represent a map from a 14-bit space to an 8-bit space. Although video may be outputted at a first rate (e.g., a 9 Hz or 30 Hz rate), the temperature data may be outputted at a lower rate (e.g., 1 Hz). Typically, thermal data may not be updated at video frame rates, but can be updated at much slower frame rates. Thus, according to embodiments of the invention, the bandwidth may be managed by slowing down the frame rate that the temperature map is set at, for example, at 1 Hz.

In another embodiment of the invention, a reduced pixel resolution may be outputted for the temperature map instead of the full 320×240 resolution. Thus, the temperature map output may be decimated down to 160×120 or even lower, decreasing the bandwidth even further since the temperature data remains completely separate from the video contrast data. Accordingly, in an application used in real time, the temperature at any place within a scene may be extrapolated from data contained in the temperature map. Additionally, images of the scene may be stored for use later and a copy of the temperature map may be stored with the images of the scene. Images of the scene and the corresponding temperature maps may be stored for post-processing, for example, to determine other temperature points within the scene and then determine at the time the image was stored with the full temperature map.

In another embodiment of the invention, encoding techniques performed by the encoder 222 may be adjustable to include more for the integer and less for the decimal. Other encoding techniques may be implemented and may have benefits in architectures to add compression to the processing and transmission of the temperature map. Therefore, depending on a particular application for the video contrast data and temperature data, a specific dynamic range, and/or accuracy requirements, different encoding methods and varying encoding rates may be implemented.

Thus, according to embodiments of the invention, for example, in one second, nine frames of video may be transmitted. For every video frame ⅑th of the temperature map can be appended to the video frame. As such, a full temperature map may be transmitted in nine frame of video, thus encoding an overall video and temperature map stream. The video and temperature map streams may be transmitted via an Ethernet interface 226 to a wireless interface 228, for example, an interface enabled for Wi-Fi 802.11 protocols. Further, the wireless interface 228 may be coupled to a communications interface 230. The Ethernet interface 226 and communications interface 230 may further be coupled to a USB type interface 232. The USB interface 232 and wireless interface 228 may have bidirectional communications with external devices, such as an external display (e.g., monitor or television) or processing device (e.g., personal computer). The USB interface 232 may alternatively be used for charging the camera and thus may be coupled to a power and battery charging module 234.

According to an embodiment of the invention, 14-bit data may be outputted from the A/D converter 206 into the NUC/BPR module 208. At that same stage, each pixel can be observed and each 14-bit value can be determined and assigned to a temperature of each pixel, which is then included in the data of the temperature map. A lookup table may be used to map the 14-bit video levels at the NUC/BPR module 208 that converts the 14-bit video levels into a corresponding temperature map. In other embodiments of the invention, other methods may be used to convert from post-NUC/BPR video levels to temperature. For example, formulas or equations can be implemented and calculated in real-time. The lookup table may be calibrated previously for 14-bit levels, or any other corresponding input bit level. Given the 14-bit value, the lookup table is used to assign a temperature to each pixel to create the temperature map. Alternatively, the temperature maps may be implemented further downstream in the process and could be transmitted in addition to post-AGC video data, stored, and thus used in a post-process to reconstruct original temperature data. Thus, the temperature maps may achieve benefits and advantages of reduced bandwidth in transmissions, improved radiometric accuracy, simplified post-processing and flexibility in the methods used for contrast enhancement.

Methods and systems according to embodiments of the present invention include using the lookup table to build the temperature map prior to contrast enhancement, and transmitting the temperature map with the post-AGC video data. Additionally, methods and systems according to another embodiment of the invention create the temperature map prior to contrast enhancement, in order to allow maximum flexibility in the contrast enhancement method. Other embodiments of the invention may include the ability to adjust the data rate and/or resolution of the temperature map in order to manage bandwidth.

In an embodiment of the invention, the output of the NUC/BPR module 208 of FIG. 2 is used to create a full resolution map of the temperature of the image before it is processed through the nonlinear AGC process. The full resolution map of the temperature of the image is generated by the temperature map generator 216. So for example, for a detector 204 capturing images at a resolution of 320×240, the temperature map generator 216 creates a temperature map with a resolution of 320×240. Every pixel in the temperature map represents the temperature of whatever object that pixel is looking at.

Depending on the application of the temperature map, embodiments of the invention also provide flexibility in altering the resolution of the temperature map, such that it may be easily combined with the video stream for the camera to provide as an output. The temperature map may also be transmitted at a different frame rate, and transmitted with the video out. Applications for temperature maps may involve overlaying symbology showing the temperature of various points or regions in a scene, for which full frame rate updating of the symbology is not typically needed. Additionally, reducing the frame rate of the temperature map also aids in managing bandwidth. For example, the thermal camera may output video at a rate of 9 Hz and then output the temperature map at a rate of 1 Hz, essentially transmitting one temperature map for every 9 frames of video.

By creating this temperature map from the NUC/BPR data from the NUC/BPR module 208 that has not yet gone through the AGC module 214, the temperature map preserves the temperature information and the radiometric information from the detector 204. Preserving this data permits significant flexibility in performing AGC or using other contrast enhancement methods. AGC in general is a non-linear process, and in an embodiment of the invention, may involve sending some mapping or a look up table for each video frame at each post-AGC video frame, which detects all the grayscale values, and converts them back to equivalent object temperatures. However, as the AGC 214 processes frame to frame, the mapping may change. Thus, in an embodiment of the invention, the method may include outputting with each frame, a mapping to relate back to temperatures, which may be kept separate. By having the separate temperature map, the system can keep track of temperature data separate from video gray levels, which enables more flexibility in contrast enhancements.

In an embodiment of the invention, the temperature map generator 216 may generate a temperature map using temperature data extracted from the ADC 206. Then the lookup table may map the average response of the arrays of temperatures and apply those to corresponding pixels in the video frame. However, because the temperature map is generated before non-uniformity correction and bad pixel replacement, there may be pixel to pixel variability, so the average response to the array aids in compensating for the individual pixel variability and provides accuracy despite the non-uniform pixels.

Figure 3:
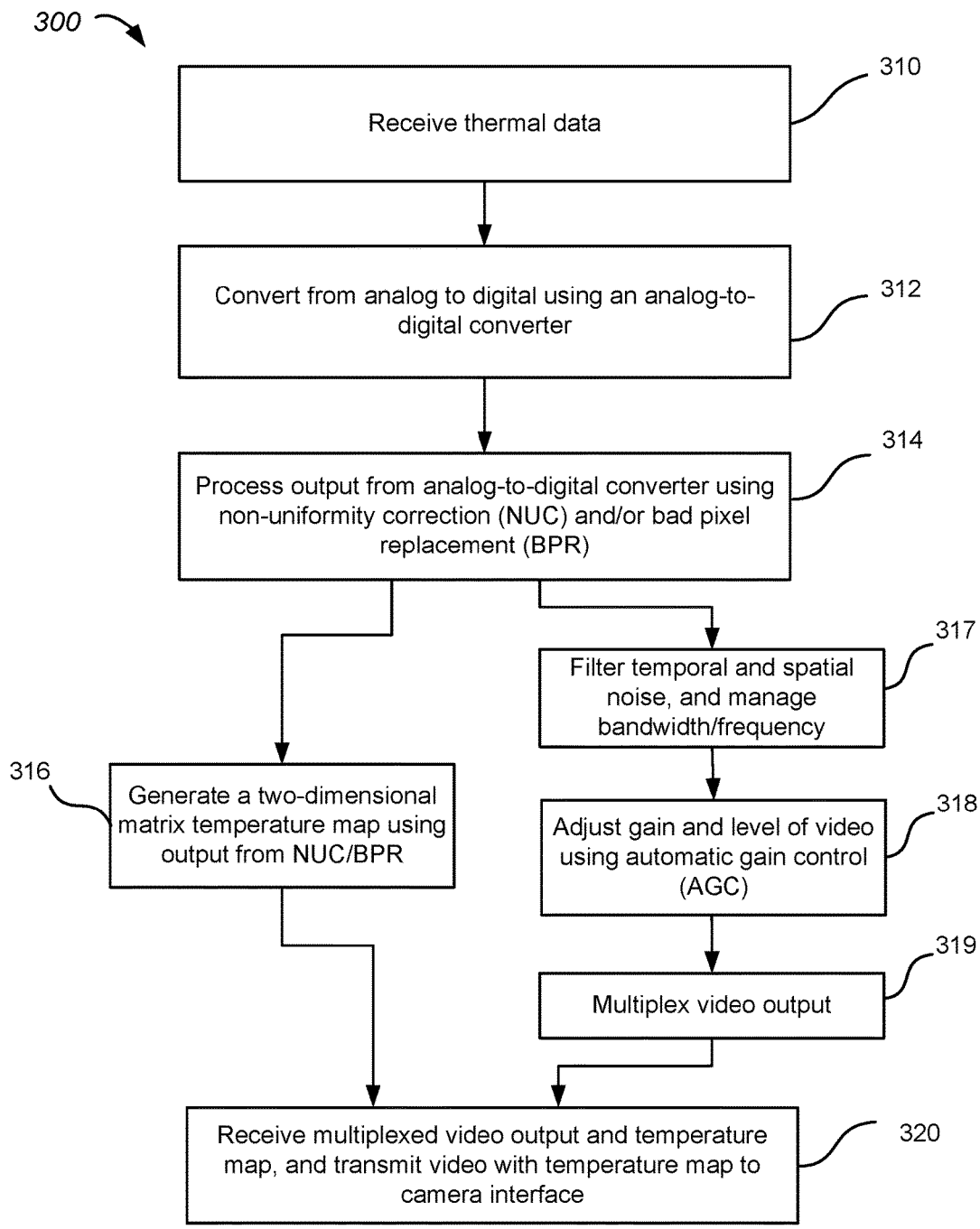
FIG. 3 illustrates an example flow diagram of a method according to one embodiment of the invention.

FIG. 3 illustrates a flow chart of an example method 300 according to one embodiment of the invention. In step 310, a radiometric thermal camera (e.g., radiometric infrared camera) according to embodiments of the invention may be configured to receive thermal data. The thermal data may be converted, in step 312, from analog to digital using an analog-to-digital converter. In step 314, the digital output from the analog-to-digital converter may be processed using non-uniformity correction and/or bad pixel replacement. The result of the non-uniformity correction may then be used to generate a two-dimensional matrix representing a temperature map using a lookup table to map digital values of each pixel to a temperature of a scene, as seen in step 316.

Simultaneously or concurrently in step 317, the result from the non-uniformity and bad pixel replacement may then be processed to filter out temporal and spatial noise, and to manage the bandwidth. Filtering out temporal noise may be performed by frame integration (executed by frame integrator 210 of FIG. 2). The spatial noise may be filtered out of the video data by the spatial noise filter 211 of FIG. 2. To manage the bandwidth, a throttle 212 of FIG. 2 may adjust the frequency to a lower frequency than the data captured from the scene. At step 318, the gain and level of the video from the NUC/BPR module is adjusted by the AGC. The output from the AGC may then be processed through a multiplexer and encoded with the temperature map in steps 320 to be transmitted in a data channel.

After the NUC and BPR processing 314, the temperature map is generated at 316 concurrently (e.g., simultaneously) as frame throttling, the spatial filtering, temporal filtering, and AGC processing at 318. At 320, the output from the AGC at 318 may be processed using multiplexor. As shown in FIG. 2, the camera serial interface receives two data streams, the temperature maps from 316 and the output of the multiplexor from 318.

The video data may be streamed with the temperature map in the serial interface be creating for each 320×240 frame of video, ⅑th of the temperature map. Thus, after 9 sequential frames of video are transmitted, a full temperature map may be reconstructed. For each video frame, a superframe of data is created; thus for 9 Hz video and 1 Hz temperature map, the superframe would comprise a 320×240 frame of video followed by ⅑ of the temperature map, which would be the first ⅑ of the 204 rows of the temperature map. The next superframe would comprise the next 320×240 frame of video with the second ⅑ of the temperature map.

In an embodiment, an end user having a mobile device may operate an application on the mobile device that is enabled to reconstruct the fractions of the temperature map into a full temperature map. The application operated on the mobile device may receive the superframes and have code programmed to parse the superframe out, separate the video frame from the partial temperature map, and reconstruct the full temperature map and the video stream.

As such, in an embodiment of the invention, the thermal camera's wireless interface may be enabled to communicate with an application on a mobile device of an end user. The application may be capable of parsing out the temperature map and the video data, and reconstructing the temperature map and the video data in a format and manner usable and displayable to the end user.

According to an embodiment of the invention, the thermal camera has local buffering capability sufficient for processing the video and thermal data for transmission to a mobile device. Most mobile devices tend to have their own data storage, as well an ability to include video and/or temperature maps reconstructed in the application into e-mail, text, and/or social media platforms. However, in another embodiment of the invention, the thermal camera may be enabled to have external data storage, such as an SD card, flash memory, or compact memory.

The temperature map includes object temperatures, specifically object-apparent black body temperatures encoded in Kelvin in an 11.5 format, where the 11 bits of the 16 bit format, output in an 11.5 decoding scheme. In an 11.5 decoding scheme, the first 11 bits are the most significant bits, and represent the integer portion of the Kelvin apparent black body temperature. The last 5 least significant bits are the decimal portion of that apparent black body temperature in Kelvin. The lookup table are used to take the output of that NUC/BPR module, the output containing 0 to 16383 values, and map those values to their appropriate 16 bit output temperature values. Accordingly, the lookup table converts the video levels to 16 bit temperatures in Kelvin.

Various encoding schemes may be used. For example, increasing that bit depth for greater precision or greater dynamic range, or decreasing that depth to manage bandwidth if lower dynamic range or lesser precision are acceptable. The temperature map may also be encoded in Celsius, Fahrenheit, or any other temperatures or scale.

The lookup tables used may be factory calibrated or predetermined, and may be programmed into the thermal camera. In an embodiment of the invention, the lookup tables used may be given a dynamic range. For instance, a dynamic range may be −20 C to 120 C. Another dynamic range may be 0 C to 650 C. For any one of those dynamic ranges, the same lookup table may be used for every thermal camera.

Embodiments of the invention provide a method that conveys the temperature information of a scene derived from the same data that the video data is captured and derived from. Further, embodiments of the invention allow for modification of the video data without impacting the temperature data, which is achieved by extracting temperature data early in the data stream before video processing such that both video and temperature data presented to an end user downstream can be very accurate and easily displayed to the end user.

The thermal camera according to an embodiment of the invention can generate a temperature map based on the extracted temperature data and then transmit the temperature map and the thermal data in various communications channels (e.g., USB). The temperature map is generated before the contrast enhancement, and simultaneously or concurrently transmitted with the video—the gray stage color video with the temperature data. The end user can infer what the temperature of objects within the scenes are based on what their grayscale or color is. Methods according to embodiments of the invention allow preservation of all of the accuracies in the temperature measurement and radiated accuracy, without being degraded or destroyed by contrast enhancement processes used to display that imagery. The temperature data is kept separately so that guessing or inferring what the temperature is based on the gray scale values or the color values.

It should be appreciated that the specific steps illustrated in FIG. 3 provide a particular method of processing and transmitting temperature data of a scene in a temperature map. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
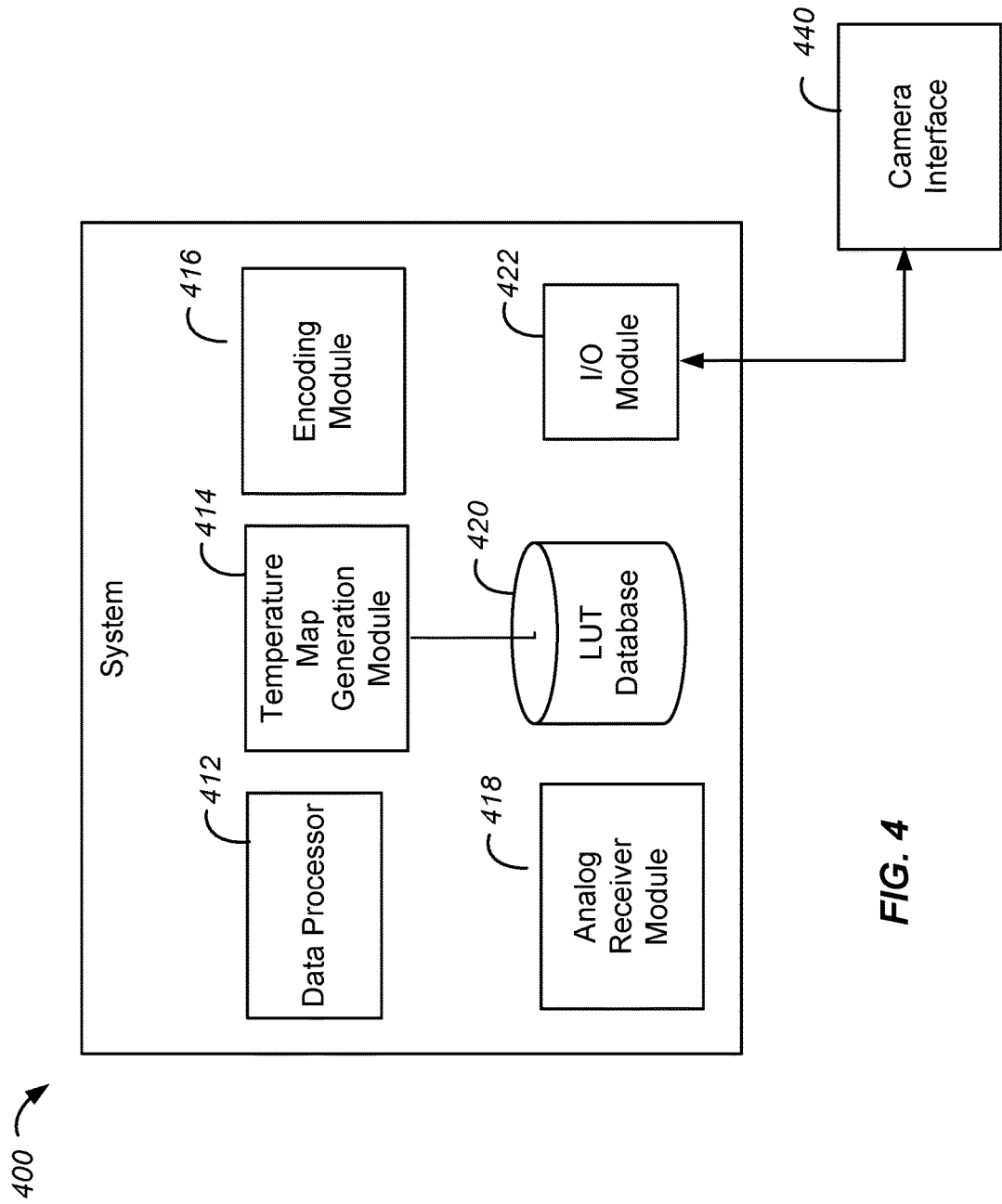
FIG. 4 illustrates an example block diagram of a system according to one embodiment of the invention.

FIG. 4 illustrates an exemplary system 400 enabled to execute the functions and processes described above. The system may comprise a processing module 412, such as a central processing unit, or other computing module for processing data. The system 400 may include a non-transitory computer-readable medium, such as a static or dynamic memory (e.g., read-access memory, or the like), storing code for executing tasks and processes described herein.

For example, the computer-readable medium may comprise a temperature map generation module 414 to access a lookup table (LUT) database 420, storing lookup tables to map pixel data to temperature data, as represented by steps shown in 314 and 316 in FIG. 3. The computer-readable medium may also include an encoding module 416 to encode the generated temperature map with processed video data, as shown in steps 318 and 320 of FIG. 3, for example. The encoding of the temperature map with the video data may be transmitted to a camera interface 440 through an I/O module 422, or other suitable user interface module.

According to an embodiment of the invention, the thermal camera has local buffering capability in the data processor 412 that is sufficient for processing the video and thermal data for transmission to a mobile device through the I/O module 422. Most mobile devices tend to have their own data storage (mobile device is not shown, but user interface 440 of mobile device is shown), as well an ability to include video and/or temperature maps reconstructed in the application into e-mail, text, and/or social media platforms. However, in another embodiment of the invention, the thermal system 400 may be enabled to have external data storage, such as an SD card, flash memory, or compact memory.

The temperature map generated by the temperature map generation module 414 may include object temperatures, specifically object-apparent black body temperatures encoded in Kelvin in an 11.5 format, where the 11 bits of the 16 bit format, output in an 11.5 decoding scheme, which may be decoded/encoded by the encoding module 416. In an 11.5 decoding scheme, the first 11 bits are the most significant bits, and represent the integer portion of the Kelvin apparent black body temperature. The last 5 least significant bits are the decimal portion of that apparent black body temperature in Kelvin. The lookup tables stored in the LUT database 420 are used to take the output of that NUC/BPR module, the output containing 0 to 16383 values, and map those values to their appropriate 16 bit output temperature values. Accordingly, the lookup table converts the video levels to 16 bit temperatures in Kelvin.

Various encoding schemes may be used by the encoding module 416. For example, increasing that bit depth for greater precision or greater dynamic range, or decreasing that depth to manage bandwidth if lower dynamic range or lesser precision are acceptable. The temperature map may also be encoded in Celsius, Fahrenheit, or any other temperatures or scale.

The lookup tables stored in the LUT database 420 may be factory calibrated or predetermined, and may be programmed into the thermal camera. In an embodiment of the invention, the lookup tables used may be given a dynamic range. For instance, a dynamic range may be −20 C to 120 C. Another dynamic range may be 0 C to 650 C. Calibration for the NUC/BPR processing may adhere to lookup tables stored in the LUT database 420.

Embodiments may be practiced with various computer system configurations such as infrared cameras, hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 4 shows one example of a data processing system, such as data processing system 400, which may be used with the present described embodiments. Note that while FIG. 4 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 4 may, for example, be a personal computer (PC), workstation, tablet, smartphone or other hand-held wireless device, or any device having similar functionality.

For example, the system can include a system bus which is coupled to a microprocessor, a Read-Only Memory (ROM), a volatile Random Access Memory (RAM), as well as other nonvolatile memory. The microprocessor can be coupled to a cache memory. System bus can be adapted to interconnect these various components together and also interconnect components to a display controller and display device, and to peripheral devices such as input/output ("I/O") devices. Types of I/O devices can include keyboards, modems, network interfaces, printers, scanners, video cameras, or other devices well known in the art. Typically, I/O devices are coupled to the system bus through I/O controllers. In one embodiment the I/O controller may include a Universal Serial Bus ("USB") adapter for controlling USB peripherals or other type of bus adapter.

RAM can be implemented as dynamic RAM ("DRAM") which requires power continually in order to refresh or maintain the data in the memory. The other nonvolatile memory can be a magnetic hard drive, magnetic optical drive, optical drive, DVD RAM, or other type of memory system that maintains data after power is removed from the system. While FIG. 4 shows that nonvolatile memory as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 400, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of generating a temperature map of a scene, the method comprising:
   receiving, at a detector, light data of the scene, wherein the light data includes a plurality of frames of analog infrared light data;
   converting each of the plurality of frames of analog infrared light data from analog to digital format to create digital infrared light data including a plurality of digital frames corresponding to the plurality of frames of analog infrared light data;
   creating a lookup table for each frame of the plurality of digital frames based on the digital infrared light data;
   generating the temperature map using the lookup table;
   separately transmitting the temperature map and the digital infrared light data in a data channel;
   integrating the plurality of digital frames in the digital infrared light data at a frame rate, thereby creating integrated digital video data;
   adjusting a gain of the integrated digital video data at the frame rate using an automatic gain control to generate an adjusted digital video data;
   selecting a video output from at least two of the adjusted digital video data, the digital infrared light data, or the integrated digital video data to create a multiplexed video output; and
   separately transmitting the temperature map and the multiplexed video output in the data channel.

2. The method of claim 1 further comprising:
   receiving a plurality of frames of non-thermal light data;
   converting the plurality of frames of non-thermal light data from analog to digital format to create a plurality of frames of digital non-thermal light data; and
   transmitting the plurality of frames of digital non-thermal light data in the data channel.

3. The method of claim 2 wherein non-thermal light data includes visible light data.

4. The method of claim 1 further comprising calibrating the lookup table using non-uniformity correction on the digital infrared light data.

5. The method of claim 1 further comprising:
   detecting light data of the scene at a first frame rate, wherein a second frame rate of the integrated digital video data is lower than the first frame rate; and
   transmitting the temperature map at a third frame rate, wherein the third frame rate is lower than the second frame rate, wherein the temperature map is transmitted at the third frame rate separately from the digital infrared light data in the data channel.

6. An apparatus for generating a temperature map of a scene, the apparatus comprising:
   a detector configured to receive light data of the scene, wherein the light data includes analog infrared light data, and includes a plurality of frames;
   an analog to digital converter configured to convert the light data to digital light data, the digital light data including digital infrared light data;
   a lookup table generator configured to create and calibrate a lookup table for each frame of the plurality of frames based on the digital infrared light data;
   a temperature map generator configured to generate the temperature map using the lookup table;
   a data channel interface configured to transmit the temperature map separately from the digital infrared light data;
   a frame integrator configured to integrate the plurality of frames in the digital infrared light data to a frame rate, thereby creating an integrated digital video data;
   an automatic gain control unit configured to adjust a gain of the integrated digital video data at the frame rate to generate an adjusted digital video data; and
   a controller configured to select at least two of the adjusted digital video data, the digital infrared light data, or the integrated digital video data to create a multiplexed video output, wherein the data channel interface is configured to transmit the temperature map separately from the multiplexed video output.

7. The apparatus of claim 6 wherein the detector detects the light data of the scene at a first frame rate and wherein the apparatus further comprises:
   a throttle configured to regulate a second frame rate of the integrated digital video data, wherein the second frame rate is lower than the first frame rate, wherein the data channel interface is configured to transmit the temperature map at a third frame rate, wherein the third frame rate is lower than the second frame rate of the multiplexed video output, wherein the temperature map is transmitted separately from the multiplexed video output in the data channel interface.

8. The apparatus of claim 6 further comprising a calibrator configured to calibrate the lookup table using non-uniformity correction on the digital light data.

9. The apparatus of claim 6 further comprising a calibrator configured to calibrate the lookup table using bad pixel replacement on the digital light data.

10. The apparatus of claim 6 wherein the data channel interface is further configured to:
    encode the temperature map and the digital infrared light data in a data stream; and
    communicate with a wireless communication network to receive and transmit the data stream to one or more external devices.

* * * * *